United States Patent
Chen et al.

(10) Patent No.: US 10,764,359 B2
(45) Date of Patent: Sep. 1, 2020

(54) METHOD AND SERVER FOR DYNAMIC WORK TRANSFER

(71) Applicant: Industrial Technology Research Institute, Hsinchu (TW)

(72) Inventors: Lyu-Han Chen, Taoyuan (TW); Ching-Yao Wang, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 78 days.

(21) Appl. No.: 15/924,297

(22) Filed: Mar. 19, 2018

(65) Prior Publication Data

US 2019/0208006 A1 Jul. 4, 2019

(30) Foreign Application Priority Data

Jan. 4, 2018 (TW) .............................. 107100259 A

(51) Int. Cl.
*H04L 29/00* (2006.01)
*H04L 29/08* (2006.01)
(Continued)

(52) U.S. Cl.
CPC ...... *H04L 67/1002* (2013.01); *H04L 41/0826* (2013.01); *H04L 41/0896* (2013.01);
(Continued)

(58) Field of Classification Search
None
See application file for complete search history.

(56) References Cited

U.S. PATENT DOCUMENTS

| 8,751,638 B2 | 6/2014 | Ravindran et al. |
| 8,824,286 B2 | 9/2014 | Lee et al. |

(Continued)

FOREIGN PATENT DOCUMENTS

| CN | 106154904 | 11/2016 |
| TW | M460351 | 8/2013 |

(Continued)

OTHER PUBLICATIONS

Rajesh George Rajan et al.,"A Survey on Load Balancing in Cloud Computing Environments", International Journal of Advanced Research in Computer and Communication Engineering,vol. 2, Issue 12, Dec. 2013, pp. 4726-4728.

(Continued)

*Primary Examiner* — Cai Y Chen
(74) *Attorney, Agent, or Firm* — JCIPRNET

(57) ABSTRACT

A method and a server for dynamic work transfer are provided. The method includes following steps: regularly collecting and recording network resources of multiple nodes including a cloud node and multiple edge nodes in a network; receiving a request of a first job at a first time point, calculating a cost for configuring the first job to each node according to the network resource of each node at the first time point, and configuring the first job to a first target node; receiving a request of a second job at a second time point, calculating a cost for configuring the second job to each node according to the network resource of each node at the first time point, and determining a second target node suitable for configuring the second job and whether to transfer the first job; and accordingly configuring the second job and maintaining or transferring the first job.

14 Claims, 4 Drawing Sheets

(51) Int. Cl.
H04L 12/24 (2006.01)
H04L 12/26 (2006.01)
(52) U.S. Cl.
CPC .......... H04L 67/10 (2013.01); *H04L 43/0852* (2013.01); *H04L 43/10* (2013.01)

(56) References Cited

U.S. PATENT DOCUMENTS

| | | | |
|---|---|---|---|
| 9,378,063 | B2 | 6/2016 | Canoy et al. |
| 9,654,401 | B2 | 5/2017 | Wu |
| 9,722,815 | B2 | 8/2017 | Mukundan et al. |
| 9,729,675 | B2 | 8/2017 | Luecke et al. |
| 2012/0106333 | A1* | 5/2012 | Lee ................. H04L 47/125 370/230 |
| 2014/0258535 | A1* | 9/2014 | Zhang ................ H04L 45/48 709/226 |
| 2016/0299497 | A1 | 10/2016 | McLaughlin et al. |

FOREIGN PATENT DOCUMENTS

| | | |
|---|---|---|
| TW | 201501564 | 1/2015 |
| TW | I517048 | 1/2016 |

OTHER PUBLICATIONS

Manisha Verma et al.,"An architecture for Load Balancing Techniques for Fog Computing Environment", International Journal of Computer Science and Communication, vol. 6, No. 2, Apr.-Sep. 2015, pp. 269-274.
Amandeep et al.,"Different Strategies for Load Balancing in Cloud Computing Environment: a critical Study", International Journal of Scientific Research Engineering & Technology (IJSRET), vol. 3, Issue 1, Apr. 2014, pp. 85-90.
Song Ningning et al.,"Fog Computing Dynamic Load Balancing Mechanism Based on Graph Repartitioning", China Communications, vol. 13, Issue: 3, Mar. 2016, pp. 156-164.
Mathew Ryden et al.,"Nebula: Distributed Edge Cloud for Data Intensive Computing", 2014 IEEE International Conference on Cloud Engineering, Mar. 11-14, 2014, pp. 57-66.
Keqiang He et al.,"Presto: Edge-based Load Balancing for Fast Datacenter Networks", 2015 ACM Conference on Special Interest Group on Data Communication,vol. 45, Issue 4, Oct. 2015, pp. 465-478.
Dhinesh Babu L.D. et al.,"Honey bee behavior inspired load balancing of tasks in cloud computing environments", Applied Soft Computing, vol. 13, Issue 5, May 2013, pp. 2292-2303.
Maha A. Metawei et al.,"Load balancing in distributed multi-agent computing systems", Ain Shams Engineering Journal vol. 3, Issue 3, Sep. 2012, pp. 237-249.
Ka-Po Chow et al.,"On Load Balancing for Distributed Multiagent Computing", IEEE Transactions on Parallel and Distributed Systems, vol. 13, No. 8, Aug. 2002, pp. 787-801.
Byung Ha Son et al.,"Prediction-Based Dynamic Load Balancing Using Agent Migration for Multi-Agent System",2010 12th IEEE International Conference on High Performance Computing and Communications, Sep. 1-3, 2010, pp. 485-490.
I. Özcan et al. ,"A Hybrid Load Balancing Model for Multi-agent Systems",2011 International Symposium on Innovations in Intelligent Systems and Applications, Jun. 15-18, 2011, pp. 182-187.
Jiadong Zhang et al.,"A Multi-Agent based load balancing framework in Cloud Environment", 2016 9th International Symposium on Computational Intelligence and Design, Dec. 10-11, 2016, pp. 278-281.
Yong Hee Kim et al.,"An Efficient Dynamic Load Balancing Scheme for Multi-Agent System Reflecting Agent Workload",2009 International Conference on Computational Science and Engineering, Aug. 29-31, 2009, pp. 216-223.
"Notice of Allowance of Taiwan Counterpart Application," dated Jan. 30, 2020, p. 1-p. 4.

* cited by examiner

METHOD AND SERVER FOR DYNAMIC WORK TRANSFER

CROSS-REFERENCE TO RELATED APPLICATION

This application claims the priority benefit of Taiwan application serial no. 107100259, filed on Jan. 4, 2018. The entirety of the above-mentioned patent application is hereby incorporated by reference herein and made a part of this specification.

TECHNICAL FIELD

The disclosure relates to a method and an apparatus for work transfer, and particularly relates to a method and a server for dynamic work transfer.

BACKGROUND

In the past decade, various diversified information application services are provided owing to the development of network technologies and the emergence of cloud service industries. However, as the technologies of the Internet of Things (IoT) emerge, more and more apparatuses are connected to the network. When a large number of IoT apparatuses are connected to the network at the same time, a great amount of network resources (e.g., bandwidth, storage space, and CPU computation capability) is consumed, which brings challenges to cloud computing.

Edge computing is proposed to reduce the loading of cloud computing. Specifically, edge computing is based on the concept of doing computation nearby. In other words, computation is carried out in a local network closer to the data source to avoid returning the data to a cloud server as much as possible and thereby reduce the waiting time of receiving and transmitting data from and to the cloud server as well as the cost for network bandwidth. Besides, properly arranging a plurality of edge nodes may facilitate the scalability and reliability.

Nevertheless, not all the data are suitable to be configured locally for computation. For example, some data may require further analysis and judgment, and need to be transmitted to the cloud server for further processing or for long-term accessibility. Thus, network nodes need to be appropriately configured in correspondence with current job requirements to process all the jobs.

SUMMARY

One or some exemplary embodiments of the disclosure provide a method and a server for dynamically work transfer, where network nodes for processing respective jobs are re-configured based on properties and requirements of all the jobs, and network resources of the network to facilitate overall computation and network transmission performance.

A method for dynamic work transfer according to an embodiment of the disclosure is adapted for a cloud node under a cloud and edge computing framework and includes steps as follows: regularly collecting and recording network resources of a plurality of nodes in a network, wherein the nodes include a cloud node and a plurality of edge nodes; receiving a request of a first job at a first time point, calculating costs for configuring the first job to the respective nodes based on the network resources of the respective nodes at the first time point to configure the first job to a first target node of the nodes; receiving a request of a second job at a second time point, calculating costs for configuring the second job to the respective nodes based on the network resources of the respective nodes at the first time point, and determining a second target node suitable for configuring the second job and whether to transfer the first job, wherein the second time point is after the first time point; and configure the second job and maintaining or transferring the first job based on a determination result.

A server according to an embodiment of the disclosure is adapted as a cloud node under a cloud and edge computing framework. The server includes a communication apparatus, a storage apparatus, and a processor. The communication apparatus is connected to a network and communicates with a plurality of edge nodes in the network. The processor is coupled to the communication apparatus and the storage apparatus and executes a program recorded in the storage apparatus to: regularly collect network resources of a plurality of nodes in the network through the communication apparatus and record the network resources in the storage apparatus, wherein the nodes comprise the cloud node and the edge nodes; receive a request of a first job through the communication apparatus at a first time point, and calculate costs for configuring the first job to the respective nodes based on the network resources of the respective nodes at the first time point to configure the first job to a first target node of the nodes; receive a request of a second job at a second time point, calculate costs for configuring the second job to the respective nodes based on the network resources of the respective nodes at the first time point, and determine a second target node suitable for configuring the second job and whether to transfer the first job, wherein the second time point is after the first time point; and configure the second job and maintaining or transferring the first job based on a determination result.

Based on the above, the method and the server for dynamic work transfer according to the embodiments of the disclosure mainly configure the first job based on the network resources of the respective nodes at the moment when receiving the first job request through regularly collecting the network information of the nodes in the network. When the request of the second job is received, based on the network resources of the respective nodes before configuring the first job, the costs required for configuring the second job to the respective nodes are re-calculated to determine the node suitable for configuring the second job and determine whether to transfer the first job to another node. Through the method, the server according to the embodiments of the invention may re-configure the nodes for processing the respective jobs based on the properties and the requirements of all the jobs and the network resources of the network, so as to facilitate the overall computation and network transmission performance.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Embodiments of the disclosure provide a method for dynamic work transfer. When a communication apparatus detects that a new job request needs to be executed during a process where a server carries out transmission through a network, the method according to the embodiments of the disclosure allows the server to re-configure network nodes processing jobs with a specific limitation based on properties and requirements of the jobs and network resources of the network, so as to optimize dynamic resource usage and thereby facilitate overall computation and transmission performance of the network.

Figure 1:
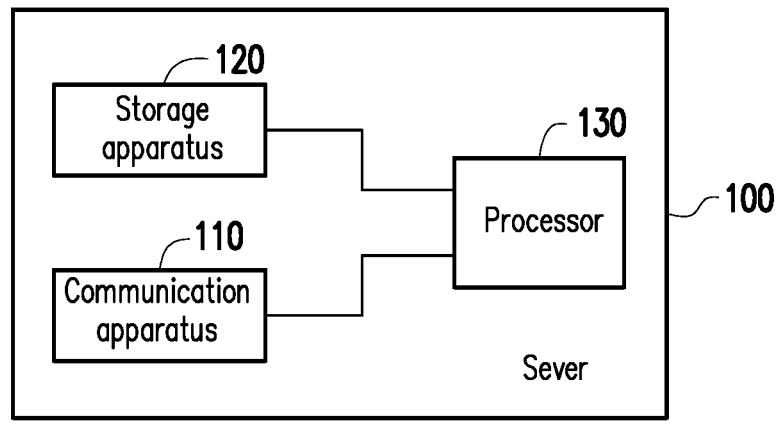
FIG. 1 is a block diagram illustrating a server according to an embodiment of the disclosure.

FIG. 1 is a block diagram illustrating a server 100 according to an embodiment of the disclosure. In the embodiment, the server 100 is suitable to serve as a cloud node under a cloud and edge computing framework, and includes a communication apparatus 110, a storage apparatus 120, and a processor 130. The communication apparatus 110 may be connected to a network to communicate with a plurality of edge nodes in the network through network connection. The processor 130 is respectively coupled to the communication apparatus 110 and a storage apparatus 120 and executes a program recorded in the storage apparatus 120.

In the embodiment, the communication apparatus 110 is a network card compatible with a wired network connection standard such as the Ethernet or a wireless network card compatible with a wireless communication standard such as Institute of Electrical and Electronics Engineers (IEEE) 802.11 n/b/g. The communication apparatus 110 may be connected to the network in a wired or wireless manner and may exchange data with an apparatus on the network. The storage apparatus 120 may be any type of fixed or mobile random access memory (RAM), read-only memory (ROM), flash memory, resistive random access memory (RRAM), ferroelectric RAM (FeRAM), magnetoresistive RAM (MRAM), phase change RAM (PRAM), conductive bridge RAM (CBRAM), or dynamic random access memory (DRAM), for example. However, the disclosure is not limited thereto. The processor 130 may be a central processing unit (CPU) or other programmable general purpose or specific purpose microprocessors, digital signal processors (DSP), programmable controllers, application specific integrated circuits (ASIC), other similar devices, or a combination thereof, for example. However, the disclosure is not limited thereto.

Figure 2:
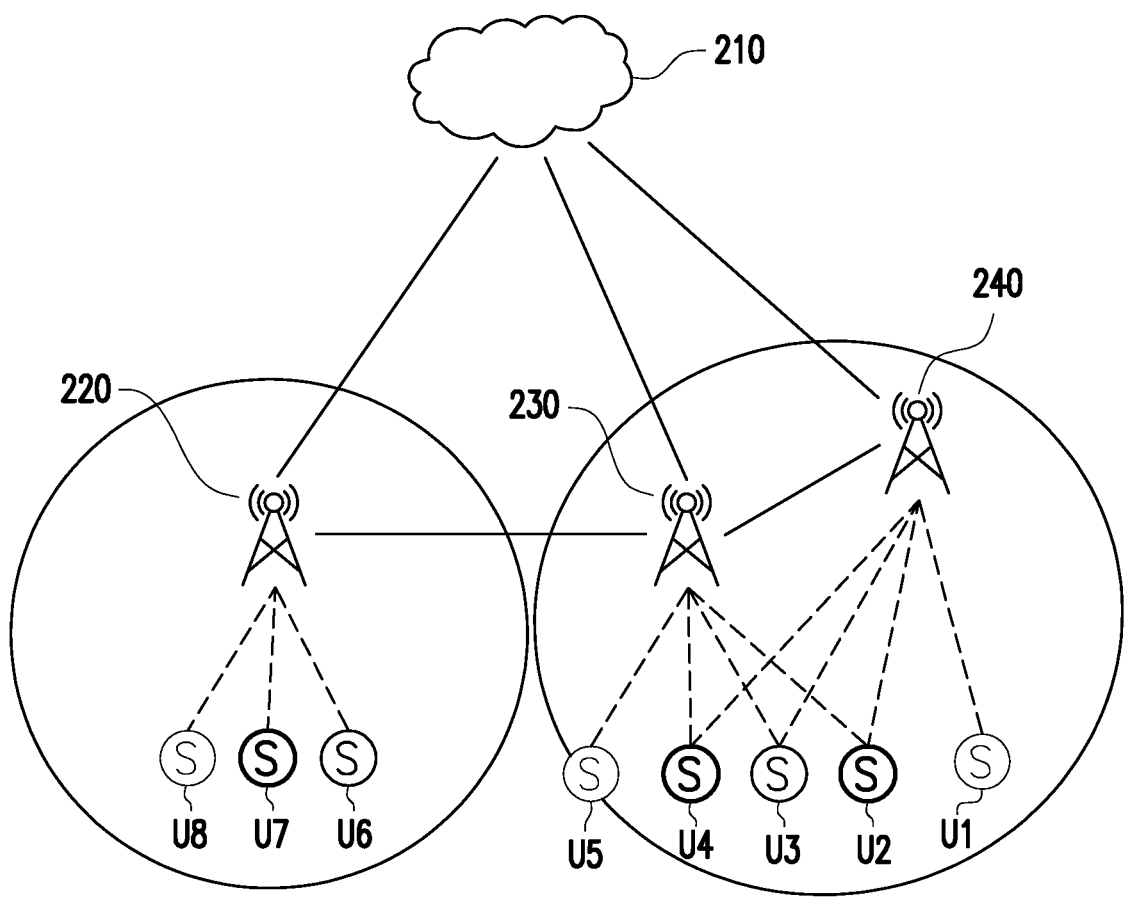
FIG. 2 is a schematic view illustrating a network framework according to an embodiment of the disclosure.

FIG. 2 is a schematic view illustrating a network framework 200 according to an embodiment of the disclosure. In FIG. 2, the network framework 200 includes a cloud node 210, a plurality of edge nodes 220 to 240, and a plurality of user apparatuses U1 to U8. As an example, the server 100 of FIG. 1 is implemented as the cloud node 210. Referring to FIGS. 1 and 2, in the embodiment, the cloud node 210 may regularly collect network resources of the edge nodes 220 to 240 in the network and its own network resource, and record the collected network resources (e.g., recording in the storage apparatus 120). The edge nodes 220 and 240 are respectively nodes adjacent to the user apparatuses U1 to U8 and may process jobs provided by the user apparatuses U1 to U8 nearby. Specifically, the cloud node 210 may receive the job requests transmitted by the user apparatuses U1 to U8 through the network, compute and evaluate network resources and data properties in the respective nodes (including the cloud node 210 and the edge nodes 220 to 240) based on the collected network resources, and configure the jobs to most suitable nodes for processing.

Figure 3:
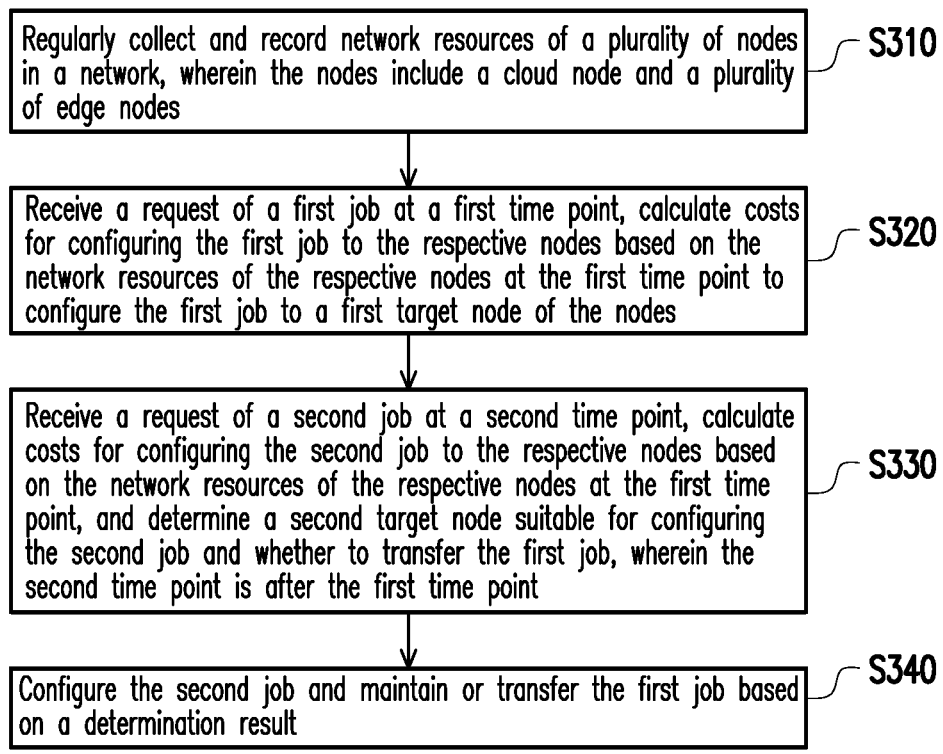
FIG. 3 is a flowchart illustrating a method for dynamic work transfer according to an embodiment of the disclosure.

FIG. 3 is a flowchart illustrating a method for dynamic work transfer according to an embodiment of the disclosure. Referring to FIGS. 1 and 3, the method of the embodiment is suitable for the server 100 of FIG. 1. In the following, detailed steps of the method for dynamic work transfer according to the embodiments of the disclosure are described with reference to the respective components in the server 100.

Figure 4:
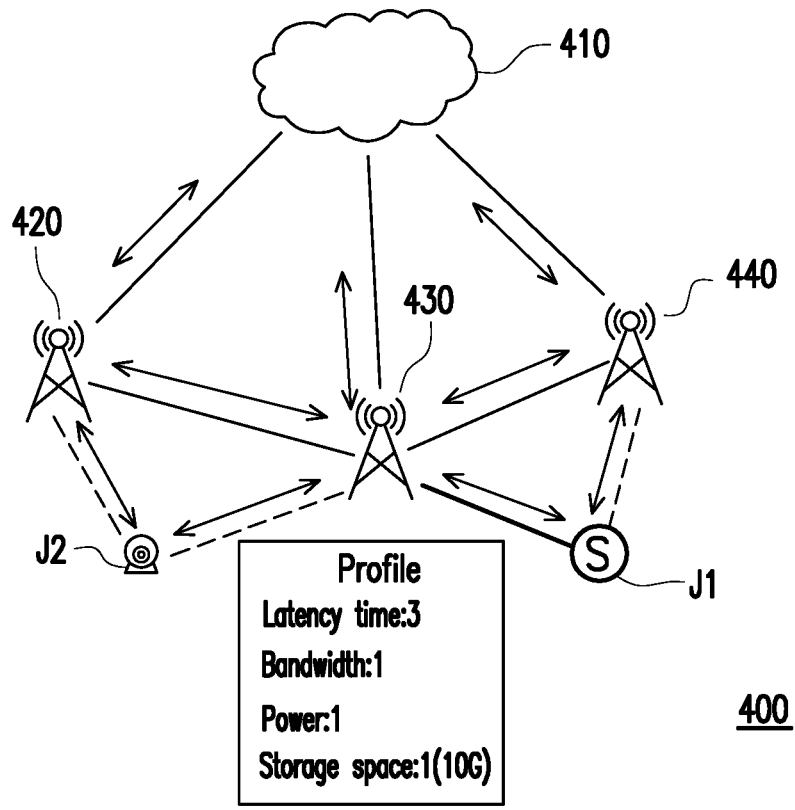
FIG. 4 is a schematic view illustrating a network framework where a plurality of nodes exchange network resources according to an embodiment of the disclosure.

At Step S310, the processor 130 may regularly collect and record network resources of a plurality of nodes in the network through the communication apparatus 110. The network resources may be a cloud network and a plurality of edge nodes in the network. Regarding the embodiment of Step S310, FIG. 4 is a schematic view illustrating a network framework 400 where a plurality of nodes exchange network resources according to an embodiment of the disclosure. Referring to FIG. 4, in the embodiment, the network framework 400 includes a cloud node 410, a plurality of edge nodes 420 to 440, a first user apparatus J1, and a second user apparatus J2.

Specifically, regarding the network sources, the respective edge nodes 420 to 440 may exchange messages with other nodes through regularly broadcasting heartbeat signals, so as to obtain respective transmission latencies with respect to the other nodes. After obtaining the transmission latency information, the respective edge nodes 420 to 440 may report their own network resources to the cloud node 410. Accordingly, the cloud node 410 may calculate and evaluate the network resources and data properties of the respective edge nodes 420 to 440. Besides, each of a first job $J_t$ and a second job $J_{t+1}$ received by the cloud node 410 from the first user apparatus J1 and the second user apparatus J2 includes a profile. The profile records a latency time, a bandwidth, a power, and a storage space of the first job $J_t$ or the second job $J_{t+1}$. In addition, numerals (e.g., 1, 3) in the profile represent the importance or weights of the respective conditions (i.e., latency time, bandwidth, power, or storage space). With the profile, the processor 130 may receive job conditions required by the jobs.

Referring to FIGS. 1 and 3, at Step S320, the processor 130 may receive a request of receiving the first job at a first time point through the communication device 110, and calculate costs for configuring the first job to the respective nodes based on the network resources of the respective nodes at the first time point, so as to configure the first job to a first target node of the nodes.

Figure 5:
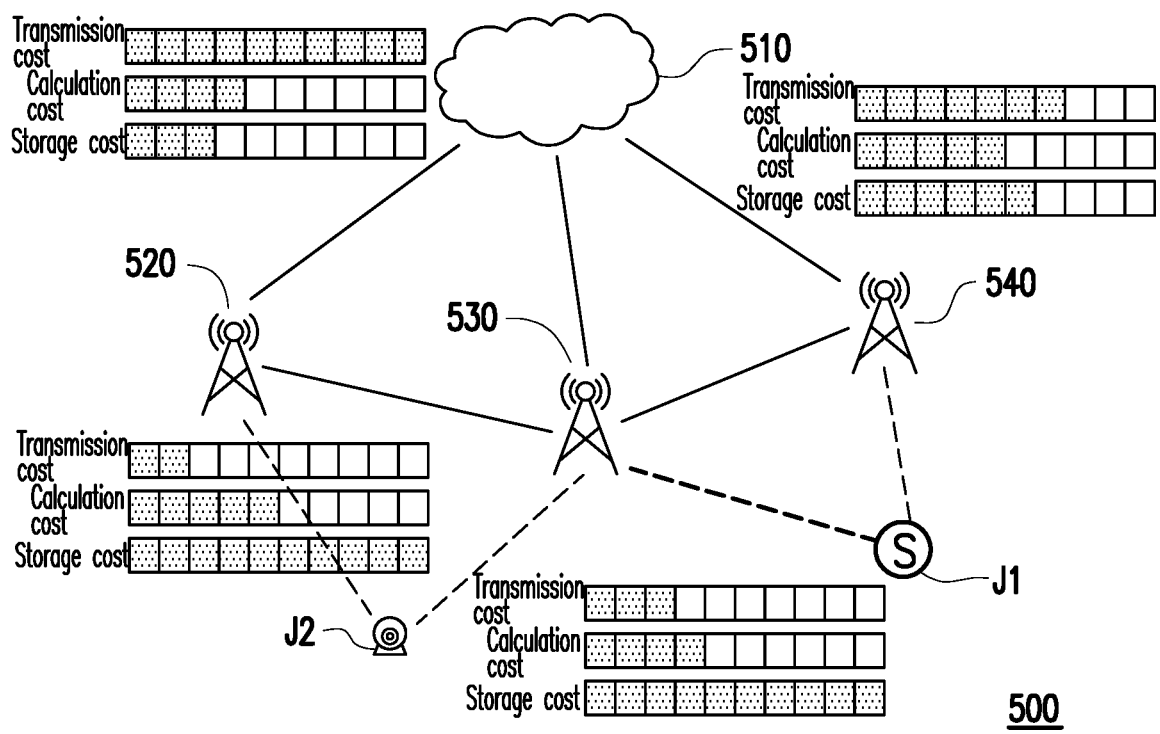
FIG. 5 is a schematic view illustrating calculating costs of arranging jobs to respective nodes in a network framework according to an embodiment of the disclosure.

Specifically, FIG. 5 is a schematic view illustrating calculating costs of arranging jobs to respective nodes in a network framework 500 according to an embodiment of the disclosure. In the embodiment, the network framework 500 includes a cloud node 510, a plurality of edge nodes 520 to 540, the first user apparatus J1, and the second user apparatus J2. In FIG. 5, the processor 130 may respectively calculate transmission costs, calculation costs, and storage costs required for configuring the first job $J_t$ to the nodes based on the network resources of the respective nodes (the edge nodes 520 to 540 and the cloud node 510) at the first time point (t). The processor 130 may further calculate weighted sums of the transmission costs, the calculation costs, and the storage costs as the costs for configuring the first job $J_t$ to the nodes. For example, regarding a node, a total cost $C_{sum}$ for configuring the first job $J_t$ to the node may be obtained by multiplying a transmission cost $C_T$, a calculation cost $C_C$, and a storage cost $C_S$ required for configuring the first job $J_t$ to the node by weights $w_1$, $w_2$, and $w_3$, respectively. A formula is provided in the following:

$$C_{sum} = w_1 \times C_T + w_2 \times C_C + w_3 \times C_S$$

To prevent an excessively high value of the network resource of a single node (e.g., the storage space of the cloud node being far greater than those of the edge nodes) from affecting balanced computing of the cost, the processor 130 may normalize the network resources of the respective nodes so as to convert the network resources into the transmission cost $C_T$, the calculation cost $C_C$, and the storage cost $C_S$.

For example, the storage cost is negatively proportional to the storage space of each of the nodes. In other words, the storage cost is lower when the storage space is greater. Assuming that a ratio among storage spaces of the respective edge nodes 520 and 540 and the cloud node 510 is 3:3:5:10, a corresponding storage cost ratio after normalization is $1/3:1/3:1/5:1/10$, i.e., 10:10:6:3. Besides, the transmission cost is positively proportional to the latency time of transmission, and is negatively proportional to the transmission bandwidth. In other words, the transmission cost is higher when the latency time is longer, and the transmission cost is lower when the transmission bandwidth is greater. Thus, considering relations among the latency time, the transmission bandwidth, and the transmission cost, a transmission cost ratio among the respective edge nodes 520 to 540 and the cloud node 510 is 2:3:7:10. Besides, the calculation costs are negatively proportional to computing capabilities of the respective nodes. In other words, the calculation cost is lower when the computing capability is stronger. Accordingly, a computing cost ratio among the respective edge nodes 520 to 540 and the cloud node 510 is 5:4:5:4.

Referring to FIG. 3, at Step S330, the processor 130 may receive a request of the second job at a second time point through the communication apparatus 110, calculate costs for configuring the second job to the respective nodes to determine a second target node suitable for configuring the second job, and determine whether to transfer the first job. Accordingly, at Step S340, the second job is configured and the first job is maintained or transferred based on a determination result. The second time point is after the first time point.

Specifically, when the request of the second job is received, an optimal node suitable to process the second job in the network may be a node to which a job is not yet configured, but may also be the node configured to process the first job. To prevent the optimal node from being occupied by the first job, which forces the second job to be configured to a second optimal node and makes it unable to achieve optimal resource allocation, when the processor 130 of the embodiment receives the new request of the second job from the user apparatus through the communication device 110 at the second time point, the processor 130 may trace back to the first time point (when the first job is received), calculate the costs for configuring the second job to the respective nodes based on the network resources at the first time point, and configure the second job to the most suitable node. Meanwhile, the processor 130 also determines whether to transfer the previous first job based on a calculation result. In other words, if the optimal node suitable to process the second job is the node previously configured to process the first job, a cost for transferring the first job to another node may be further taken into consideration to determine whether to transfer the first job.

Figure 6:
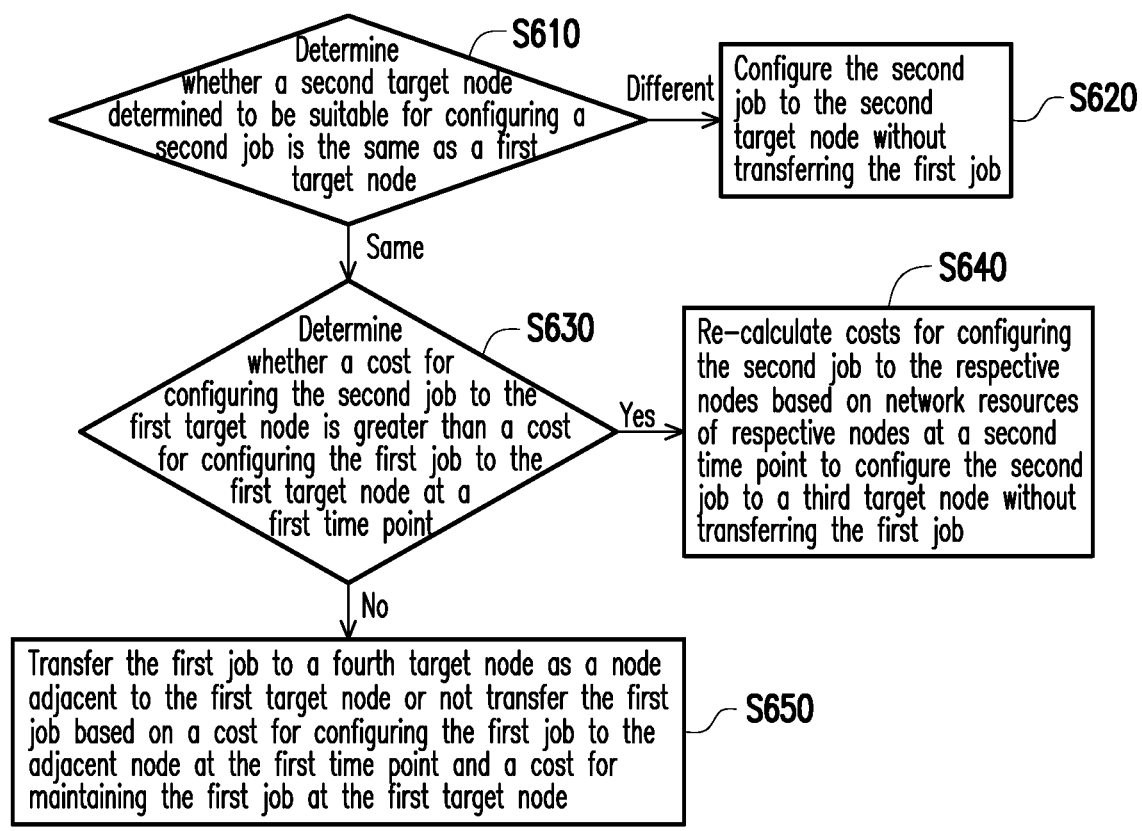
FIG. 6 is a flowchart illustrating a method for determining whether to transfer a job according to an embodiment of the disclosure.

Specifically, FIG. 6 is a flowchart illustrating a method for determining whether to transfer a job according to an embodiment of the disclosure. Referring to FIGS. 1 and 6, at Step S610, the processor 130 may determine whether the second target node suitable for configuring the second job is the same as the first target node previously configured to process the first job.

If the second target node is different from the first target node, the processor 130 does not need to transfer the first job at Step S620. Therefore, the second job is configured to the second target node without transferring the first job. Comparatively, if the second target node is the same as the first target node, at Step S630, the processor 130 may further determine whether a cost for configuring the second job to the first target node is greater than a cost for configuring the first job to the first target node at the first time point. If the cost for configuring the second job to the first target node is greater than the cost for configuring the first job to the first target node at the first time point, Step S640 is executed. If the cost for configuring the second job to the first target node is not greater than the cost for configuring the first job to the first target node at the first time point, Step S650 is executed.

If a determination result at Step S630 indicates that the cost for configuring the second job to the first target node is greater than the cost for configuring the first job to the first target node at the first time point, costs for configuring the second job to the respective nodes are calculated again based on the network resources of the respective nodes at the second time point to configure the second job to a third target node without transferring the first job. Specifically, based on the costs for configuring the second job to the respective nodes calculated based on the second time point, the processor 130 may configure the second job to a node requiring a minimum cost.

If the determination result at Step S630 indicates that the cost for configuring the second job to the first target node is not greater than the cost for configuring the first job to the first target node at the first time point, whether to transfer the first job to a fourth target node as an adjacent node or not transfer the first job is determined based on a cost for configuring the first job to the adjacent node of the first target node at the first time point and a cost for maintaining the first job at the first target node at the second time point.

Figure 7:
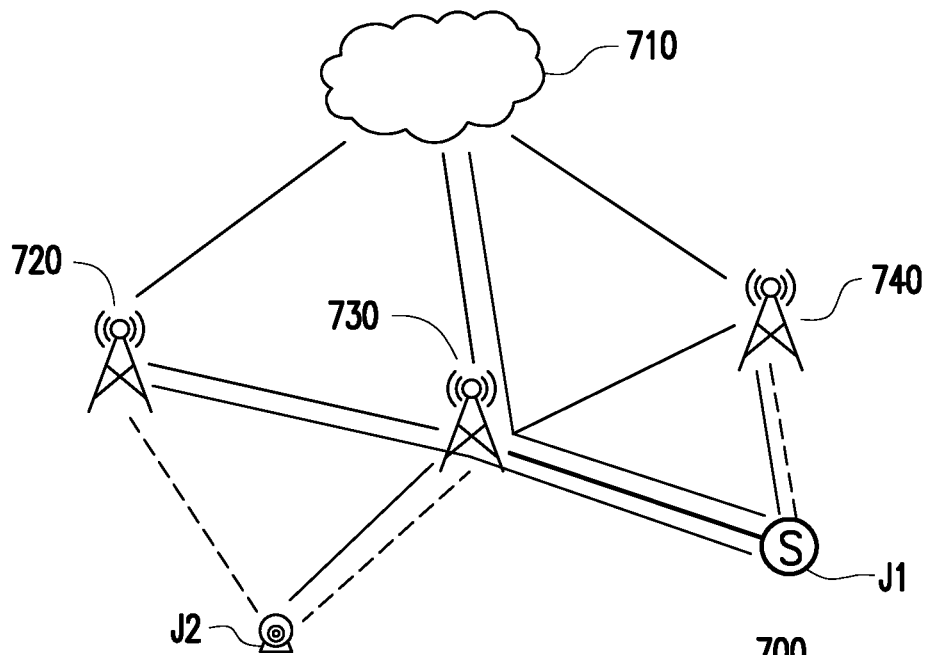
FIG. 7 is a schematic view illustrating a network framework for determining whether to transfer a job according to an embodiment of the disclosure.

For example, FIG. 7 is a schematic view illustrating a network framework 700 for determining whether to transfer a job according to an embodiment of the disclosure. In the embodiment, the network framework 700 includes a cloud node 710, a plurality of edge nodes 720 to 740, a first user apparatus J1, and a second user apparatus J2. It is assumed that the cloud node 710 configures the first job $J_t$ of the first user apparatus J1 to the edge node 730 at a first time point t. When the cloud node 710 receives the request of the second job $J_{t+1}$ of the second user apparatus J2 at a second time point t+1, since the processor 130 determines that a cost for configuring the second job $J_{t+1}$ to the edge node 730 is lower than a cost required for configuring the first job $J_t$ to the edge node 730, the processor 130 may configure the second job $J_{t+1}$ to the edge node 730 at the second time point t+1. Under such circumstance, the processor 130 may determine a cost required for configuring the first job $J_t$ to another node (the cloud node 710 or the edge nodes 720 to 740) to configure the first job $J_t$ to the node requiring the minimum cost.

In other words, under the circumstance, the cloud node 710 may further calculate a cost required for configuring the first job $J_t$ to the cloud node 710 or the edge node 720 or 740 (adjacent to the edge node 730) at the first time point t and a cost required for configuring the first job $J_t$ to the edge node 730 at the second time point t+1. If the processor 130 determines that the cost for configuring the first job $J_t$ to the adjacent node of the edge node 730 is lower based on the calculation results, the processor 130 may transfer the first job $J_t$ to another node (e.g., one of the cloud node 710 and the edge nodes 720 and 740). Comparatively, if the processor 130 determines that a cost for maintaining the first job $J_t$ at the edge node 730 is lower, the processor 130 may maintain the first job $J_t$ to be processed at the edge node 730.

It should be noted that, in an embodiment, when the processor 130 transfers a job in correspondence with a request of the second job $J_{t+1}$, the processor 130 may, for example, only transfer a job within k hops from the second job $J_{t+1}$. In other words, the processor 130 only transfers a job configured to a node keeping k hops or fewer from a transmitting end of the second job $J_{t+1}$, wherein k is a positive integer.

Moreover, in the embodiment, the first job may refer to a job previous to the second job. Alternatively, in another embodiment, the first job may also refer to a job $n^{th}$ previous to the second job, wherein n is a positive integer. In other words, when receiving a new job, the processor 130 may, for example, trace back to a time point before an $n^{th}$ previous job is configured, and re-evaluate nodes between a node suitable for processing the $n^{th}$ previous job and a node currently receiving the new job based on network resources at the time point, and re-configure the nodes for processing the jobs, so as to further facilitate the overall computation and network transmission performance.

In view of the foregoing, in addition to providing a load balancing mechanism based on a cost function, when a new job is received, the method and the server for dynamic work transfer according to the embodiments of the disclosure trace back to the network resources when another job is previously configured to re-configure the nodes for processing the jobs. Besides, considering a higher complexity involved in re-configuring all the jobs, the space (i.e., the number of nodes to a transmitting end of the new job) and the time (i.e., the number of jobs to be traced back and reconfigured) of the job to be re-configured are limited to optimize dynamic resource usage.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for dynamic work transfer, adapted for a cloud node under a cloud and edge computing framework, the method comprising:
    regularly collecting and recording network resources of a plurality of nodes in a network, wherein the nodes comprise a cloud node and a plurality of edge nodes;
    in response to receiving a request of a first job at a first time point, calculating costs for configuring the first job to the respective nodes based on the network resources of the respective nodes at the first time point to configure the first job to a first target node of the nodes;
    in response to receiving a request of a second job at a second time point, calculating costs for configuring the second job to the respective nodes based on the network resources of the respective nodes at the first time point, and determining a second target node suitable for configuring the second job and whether to transfer the first job, wherein the second time point is after the first time point; and
    configuring the second job and maintaining or transferring the first job based on a determination result.

2. The method for dynamic work transfer as claimed in claim 1, wherein determining whether to transfer the first job comprises:
    determining whether the second target node suitable for configuring the second job is the same as the first target node;
    configuring the second job to the second target node without transferring the first job if the second target node suitable for configuring the second job is not the same as the first target node;
    determining whether a cost for configuring the second job to the first target node is greater than a cost for configuring the first job to the first target node at the first time point if the second target node suitable for configuring the second job is the same as the first target node;
    re-calculating costs for configuring the second job to the respective nodes based on the network resources of the respective nodes at the second time point to configure the second job to a third target node without transferring the first job if the cost for configuring the second job to the first target node is greater than the cost for configuring the first job to the first target node at the first time point; and
    transferring the first job to a fourth target node as an adjacent node of the first target node or not transferring the first job based on a cost for configuring the first job to the adjacent node at the first time point and a cost for maintaining the first job at the first target node at the second time point if the cost for configuring the second job to the first target node is not greater than the cost for configuring the first job to the first target node at the first time point.

3. The method for dynamic work transfer as claimed in claim 1, wherein the network resources comprise respective transmission latencies with respect to other nodes obtained by each of the edge nodes through regularly exchanging messages with the other nodes.

4. The method for dynamic work transfer as claimed in claim 1, wherein calculating the costs for configuring the first job to the respective nodes based on the network resources of the respective nodes at the first time point comprises:
    calculating a transmission cost, a calculation cost, and a storage cost required for configuring the first job to the respective node based on the network resource of each of the nodes at the first time point, and calculating a weighted sum of the transmission cost, the calculation cost, and the storage cost as the cost for configuring the first job to the node.

5. The method for dynamic work transfer as claimed in claim 4, wherein calculating the transmission cost, the calculation cost, and the storage cost required for configuring the first job to the respective node based on the network resource of each of the nodes at the first time point comprises:

normalizing the network resource of each of the nodes to convert the network resource into the transmission cost, the calculation cost, and the storage cost.

6. The method for dynamic work transfer as claimed in claim 1, wherein the first job is a job $n^{th}$ previous to the second job, wherein n is a positive integer.

7. The method for dynamic work transfer as claimed in claim 1, wherein configuring the second job and maintaining or transferring the first job based on the determination result comprises:

only transferring a job configured to a node keeping k hops or fewer from a transmitting end of the second job, wherein k is a positive integer.

8. A server, adapted as a cloud node under a cloud and edge computing framework, the server comprising:

a communication apparatus, connected to a network and communicating with a plurality of edge nodes in the network;

a storage apparatus; and a processor, coupled to the communication apparatus and the storage apparatus and executing a program recorded in the storage apparatus to:

regularly collect network resources of a plurality of nodes in the network through the communication apparatus and record the network resources in the storage apparatus, wherein the nodes comprise the cloud node and the edge nodes;

in response to receiving a request of a first job through the communication apparatus at a first time point, calculate costs for configuring the first job to the respective nodes based on the network resources of the respective nodes at the first time point to configure the first job to a first target node of the nodes;

in response to receiving a request of a second job at a second time point, calculate costs for configuring the second job to the respective nodes based on the network resources of the respective nodes at the first time point, and determine a second target node suitable for configuring the second job and whether to transfer the first job, wherein the second time point is after the first time point; and configure the second job and maintain or transfer the first job based on a determination result.

9. The server as claimed in claim 8, wherein the processor comprises:

determining whether the second target node suitable for configuring the second job is the same as the first target node;

configuring the second job to the second target node without transferring the first job by the processor if the second target node suitable for configuring the second job is not the same as the first target node;

determining whether a cost for configuring the second job to the first target node is greater than a cost for configuring the first job to the first target node at the first time point by the processor if the second target node suitable for configuring the second job is the same as the first target node;

re-calculating costs for configuring the second job to the respective nodes based on the network resources of the respective nodes at the second time point to configure the second job to a third target node without transferring the first job by the processor if the cost for configuring the second job to the first target node is greater than the cost for configuring the first job to the first target node at the first time point; and transferring the first job to a fourth target node as an adjacent node of the first target node or not transferring the first job by the processor based on a cost for configuring the first job to the adjacent node at the first time point and a cost for maintaining the first job at the first target node at the second time point if the cost for configuring the second job to the first target node is not greater than the cost for configuring the first job to the first target node at the first time point.

10. The server as claimed in claim 8, wherein the network resources comprise respective transmission latencies with respect to other nodes obtained by each of the edge nodes through regularly exchanging messages with the other nodes.

11. The server as claimed in claim 8, wherein the processor comprises calculating a transmission cost, a calculation cost, and a storage cost required for configuring the first job to the respective node based on the network resource of each of the nodes at the first time point, and calculating a weighted sum of the transmission cost, the calculation cost, and the storage cost as the cost for configuring the first job to the node.

12. The server as claimed in claim 11, wherein the processor comprises normalizing the network resource of each of the nodes to convert the network resource into the transmission cost, the calculation cost, and the storage cost.

13. The server as claimed in claim 8, wherein the first job is a job $n^{th}$ previous to the second job, wherein n is a positive integer.

14. The server as claimed in claim 8, wherein the processor only transfers a job configured to a node keeping k hops or fewer from a transmitting end of the second job, wherein k is a positive integer.

* * * * *